(12) United States Patent
Williams

(10) Patent No.: US 12,518,531 B2
(45) Date of Patent: Jan. 6, 2026

(54) SYSTEM AND METHOD FOR MANAGING AND INTERACTING WITH EVENT INFORMATION

(71) Applicant: Stephen Williams, New York, NY (US)

(72) Inventor: Stephen Williams, New York, NY (US)

( * ) Notice: Subject to any disclaimer, the term of this patent is extended or adjusted under 35 U.S.C. 154(b) by 471 days.

(21) Appl. No.: 18/093,025

(22) Filed: Jan. 4, 2023

(65) Prior Publication Data

US 2023/0343097 A1 Oct. 26, 2023

Related U.S. Application Data

(60) Provisional application No. 63/334,033, filed on Apr. 22, 2022.

(51) Int. Cl.
*G06V 20/40* (2022.01)
*H04N 21/2187* (2011.01)

(52) U.S. Cl.
CPC .............. *G06V 20/42* (2022.01); *G06V 20/44* (2022.01); *H04N 21/2187* (2013.01)

(58) Field of Classification Search
CPC ........ G06V 20/42; G06V 20/44; G06V 20/52; H04N 21/2187
See application file for complete search history.

(56) References Cited

U.S. PATENT DOCUMENTS

| | | | | |
|---|---|---|---|---|
| 9,298,986 | B2 * | 3/2016 | Ferlatte | G06V 20/42 |
| 9,813,642 | B1 * | 11/2017 | Chen | H04N 5/265 |
| 10,204,342 | B2 * | 2/2019 | Valentino, III | H04N 7/18 |
| 10,854,008 | B2 * | 12/2020 | Bilbrey | G06F 3/0488 |
| 11,094,025 | B2 * | 8/2021 | Smith | H04N 9/802 |
| 11,244,166 | B2 * | 2/2022 | Zhang | G06V 20/40 |
| 11,776,265 | B2 * | 10/2023 | Clark | G06V 20/42 |
| 11,799,811 | B2 * | 10/2023 | Wu | A63F 13/352 |
| 12,086,617 | B2 * | 9/2024 | Dengler | G06F 9/451 |
| 12,299,899 | B2 * | 5/2025 | Wang | G06V 10/10 |
| 2008/0303902 | A1 * | 12/2008 | Romer | G08B 13/19656 |
| | | | | 348/143 |
| 2011/0143811 | A1 * | 6/2011 | Rodriguez | H04N 1/00244 |
| | | | | 455/556.1 |
| 2011/0261049 | A1 * | 10/2011 | Cardno | G06Q 40/04 |
| | | | | 345/419 |
| 2013/0232194 | A1 * | 9/2013 | Knapp | H04L 67/10 |
| | | | | 709/203 |

(Continued)

FOREIGN PATENT DOCUMENTS

| | | | | | |
|---|---|---|---|---|---|
| CN | 110942011 | A | * | 3/2020 | ............. G06V 20/46 |
| CN | 114519117 | A | * | 5/2022 | ......... G06F 16/5866 |

(Continued)

*Primary Examiner* — Laurie A Ries
(74) *Attorney, Agent, or Firm* — The Rapacke Law Group, P.A.

(57) ABSTRACT

The embodiments disclosed herein describe for an event interaction system including a software application implemented on a computing device, such as a smart device, or accessible through a web-based portal. The application includes a graphical user interface to provide a means for a user to filter, manage, and interact with continuously update real-time event or competition data including performance, scores, images, video, and news.

19 Claims, 11 Drawing Sheets

(56) References Cited

U.S. PATENT DOCUMENTS

| | | | | |
|---|---|---|---|---|
| 2014/0364981 A1* | 12/2014 | Hofstetter | ............... | G06Q 10/10 |
| | | | | 700/92 |
| 2017/0286498 A1* | 10/2017 | Gollub | ................... | G06F 16/285 |
| 2018/0007396 A1* | 1/2018 | Deillon | ............ | H04N 21/23418 |
| 2018/0142995 A1* | 5/2018 | Macher | ...................... | F41J 5/14 |
| 2019/0045258 A1* | 2/2019 | Egedi | ................. | H04N 21/8133 |
| 2019/0052925 A1* | 2/2019 | McDowell | ......... | G06Q 30/0233 |
| 2019/0281257 A1* | 9/2019 | Kim | ....................... | G08B 21/04 |
| 2021/0097046 A1* | 4/2021 | Barthel | ................. | G06F 16/432 |
| 2021/0150215 A1* | 5/2021 | Zhang | ..................... | G10L 25/63 |
| 2021/0275059 A1* | 9/2021 | Yates | ................. | A63B 24/0062 |
| 2022/0122421 A1* | 4/2022 | Huke | .................. | G07F 17/3223 |
| 2023/0052665 A1* | 2/2023 | Burkhart | .......... | H04N 21/25891 |
| 2023/0077815 A1* | 3/2023 | Lokshin | ............... | G06V 10/764 |
| | | | | 725/141 |
| 2023/0129053 A1* | 4/2023 | Caprio | ..................... | G09B 5/02 |
| | | | | 434/81 |
| 2023/0130932 A1* | 4/2023 | Sperduti | ............ | G06Q 30/0283 |
| | | | | 703/1 |
| 2023/0222791 A1* | 7/2023 | Hall | .......................... | G06T 7/20 |
| | | | | 348/157 |
| 2024/0205375 A1* | 6/2024 | Imes | .................... | H04N 23/661 |
| 2024/0290185 A1* | 8/2024 | Lindsey | ............ | G08B 13/19673 |

FOREIGN PATENT DOCUMENTS

| | | | | |
|---|---|---|---|---|
| CN | 114616823 B | * | 5/2025 | ............. H04N 7/155 |
| WO | WO-2012027626 A2 | * | 3/2012 | ....... H04N 21/42202 |

\* cited by examiner

SYSTEM AND METHOD FOR MANAGING AND INTERACTING WITH EVENT INFORMATION

CROSS-REFERENCE TO RELATED APPLICATIONS

This application claims the benefit of U.S. Provisional Application Ser. No. 63/334,033 filed on Apr. 22, 2022.

TECHNICAL FIELD

The embodiments generally relate to computerized systems and methods for managing and interacting with event information.

BACKGROUND

Competitions have been a popular form of entertainment throughout history. Advances in technology have allowed events to be broadcast to remote viewers who are able to view event information, broadcasts, and results. However, uploading event content is a labor-intensive process for those involved.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments disclosed herein provide for an event interaction system comprising an application provided on a computing device or accessible through a web-based portal. The application includes an interface to provide a means for a user to filter, manage, and interact with continuously update real-time event or competition data including performance, scores, images, video, and news.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein:

FIG. 6 illustrates a graphical user interface (GUI) of a system operating the application program, according to some embodiments;

FIG. 7 illustrates a graphical user interface (GUI) of a system operating the application program, according to some embodiments;

FIG. 14 illustrates a graphical user interface (GUI) of a system operating the application program, according to some embodiments;

FIG. 15 illustrates a graphical user interface (GUI) of a system operating the application program, according to some embodiments;

DETAILED DESCRIPTION

Figure 1:
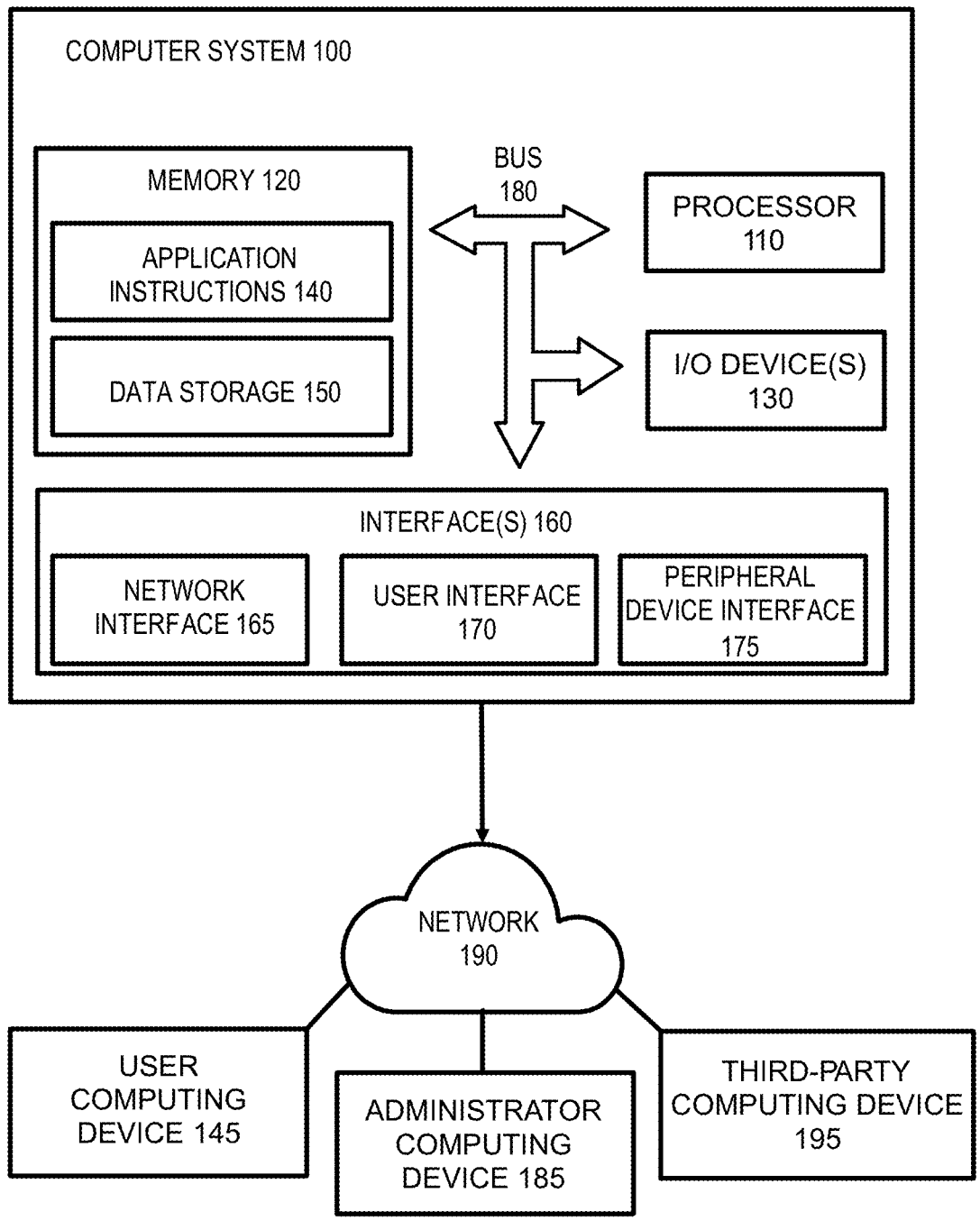
FIG. 1 illustrates a simplified diagram of the computer system operating the application program, according to some embodiments.

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, the various embodiments may be a system, method, or computer program product at any possible technical detail level of integration. A computer program product can include, among other things, a computer-readable storage medium having computer-readable program instructions thereon for causing a processor to carry out aspects of the present disclosure.

In general, the embodiments provided herein relate to systems and methods for user interaction with an event. In some embodiments, the event may include a competition element. The system may provide for interacting with event information, competition data, media, and other information in real-time.

In some embodiments, event information may include competitor information, start-times, results, video feeds, imagery, and other information. Event information may be categorized into classes, divisions, age brackets, competition type, or other categories for separating competitors.

In some embodiments, the system may provide for automatically providing and populating entry forms for each competitor. Further, the system may automatically populate event forms and other documents commonly associated with creating, advertising, interacting with, and otherwise engaging in events.

In some embodiments, the system may be in operable communication with one or more sensors which allow for the event to be monitored. For example, at least one sensor may be a timer utilized as a start/stop clock for the event, such as a timer used for horse shows or equestrian event. The timer may initiate a video capture sequence which is automatically uploaded to the user interface of the system. In such, video clips of various aspects of the event may be automatically uploaded such that users may view the video clip and other information in real-time.

In some embodiments, the system includes a listing of all media associated with an event, event category, or participant such that users may filter and view content.

In some embodiments, the interactive "prize list" includes a listing of divisions and competitions being offered for each event.

In some embodiments, a "live" class interface showcases the entries in the order in which they compete as well as standings for each division of the competition.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, or any devices that manipulate signals based on operational instructions. For example, the processor(s) 110 may be one or more hardware processors or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 150, configured to implement certain embodiments described herein, and a database 150, comprising various data accessible by the application instructions 140. Data or data sets may include information, images, video, statistics, records, or the like. In some embodiments, the application instructions 140 include software elements corresponding to one or more of the various embodiments described herein. For example, application instructions 140 may be implemented in various embodiments using any desired programming language, scripting language, or combination of programming or scripting languages (e.g., C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include, for example, RAM, which can act as external cache memory. The memory or memory components of the systems or computer-implemented methods can include the foregoing or other suitable types of memory.

Generally, a computing device will also include, or be operatively coupled to receive data from or transfer data to, or both, one or more mass data storage devices; however, a computing device need not have such devices. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190 such as cloud based storage. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), or an indirect peer-to-peer network (e.g., devices communicating through a server, router, or other network device). The network 190 can comprise copper transmission cables, optical transmission fibers, wireless transmission, routers, firewalls, switches, gateway computers or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In some embodiments, the computer system 100 may include a user computing device 145, an administrator computing device 185 and a third-party computing device 195 each in communication via the network 190. The administrator computing device 185 is utilized by an administrative user to moderate content and to perform other administrative functions. The third-party computing device 195 may include any third-party in communication with the system.

In this disclosure, the various embodiments are described with reference to the flowchart illustrations or block diagrams of methods, apparatus (systems), and computer program products. Those skilled in the art would understand that each block of the flowchart illustrations or block diagrams, and combinations of blocks in the flowchart illustrations or block diagrams, can be implemented by computer readable program instructions. The computer readable program instructions can be provided to a processor of a general-purpose computer, special purpose computer, or other programmable data processing apparatus to produce a machine, such that the instructions, which execute via the processor of the computer or other programmable data processing apparatus, implement the functions or acts specified in the flowchart or block diagram block or blocks. The computer readable program instructions can be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart or block diagram block or blocks.

Figure 2:
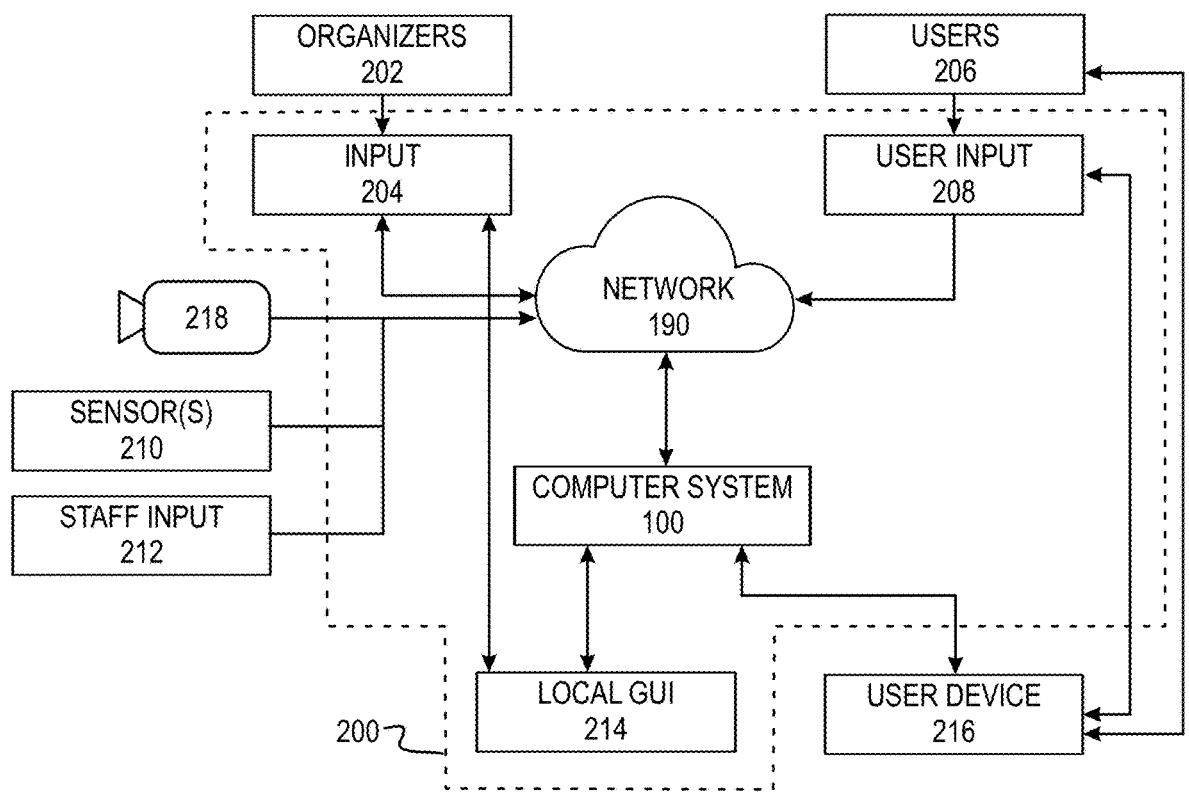
FIG. 2 illustrates a simplified diagram of the computer system operating the application program, according to some embodiments.

Referring to FIG. 2, a system and method for managing and interacting with event information 200 may include a computer system 100 in operable communication with a network 190. The system and method 200 may provide access to event and competition information for active participants and fans through entry, scheduling, scoring, results, media, and news service including pertinent details of participant performance such as score, photographs, video, required fees, prizes, competition results, or the like. The system and method 200 may be in operable communication with at least one user device 216, through which user(s) 206 may provide user input 208 to be communicated to the computer system 100 via the network 190. User input 208 may include event, sport, or competition search criteria, search filter criteria, such as event participant, schedule, performance, media, or news-based searches, relating to various events and competitions. Organizers 202 may provide organizer input 204, via an organizer smart device, such as event participants, schedules, performances, media, or news relating to various events and competitions. Organizer input 204 and user input 208 may be communicated to at least one computer system 100 and aggregated.

Simultaneously, a plurality of local event inputs such as event or competition sensors 210 or cameras 218 may be in operable communication with the computer system 100. Event staff input 212, may also be communicated to the computer system 100. Event staff input 212 may modify organizer input 204 as necessary, such as where scheduling, scoring, results, media, or news change prior to the start of an event but after organizers 206 have provided organizer input 204.

The system and method for managing and interacting with event information 200 may correlate user input 208, organizers input 204, and staff input 212 to determine a target profile, discussed below, or provide and display real-time data on the user device 216 as well as on a local GUI 214 associated with operating the system. The system and method for managing and interacting with event information 200 may cross-reference user input 208 with organizer input 204 to provide correlated data to populate a user GUI on the user device 216. In real-time, correlated data may be further modified considering event staff input 212. In real-time, the system may use correlated data to communicate with sensors 210 and cameras 218 to provide updated correlated data, such as real-time video feed of an event or real-time performance data, for display on the user device 216. That is, the system may provide for real-time image, video, and data display on a user device 216 based on the correlation of user input 208 to organizer input 204, event staff input 212, and sensor 210 and camera 218 feed data.

As a non-limiting example, a user may utilize the system to receive real-time updates on the performance of competitors in a horse race. The system may receive user input such as selection of a particular horse race, or by searching for races within a time frame, and user input for horses achieving scores or speeds above threshold values. According to some embodiments, the system may calculate a correlation score or target profile by applying weightages to scores or speeds above or below threshold values to calculate a target single value correlation score or define a target profile. As a non-limiting example, the system may generate a target profile for competitors racers averaging scores in the $80^{th}$ percentile across their previous ten races, while also considering average acceleration within the first 100 meters of a race across their previous ten races. Weightages may modify the significance of certain criteria within the target profile per a user's desired receivable data. In this way, a target profile may be generated to deliver a user's desired receivable data, information, or imagery to a user device.

Similarly, the system may determine single competitor value correlation scores, as an example, for each competitor in an event and compare it to the calculated target single value correlation score or target profile to determine which competitors' performance data and live sensor or camera data should be displayed on a user device. The system may correlate user inputs to organizer input and event staff input to aggregate real time competitors scoring and speeds above the threshold values and display, such as in a list, the competitors above the thresholds. Simultaneously, the system may correlate sensor data, such as a doppler radar speed measuring device, and camera feed(s) with the identified competitors above the threshold values to display real-time video or data associated with the identified competitors above the threshold values, or above the calculated single value correlation score.

Figure 3:
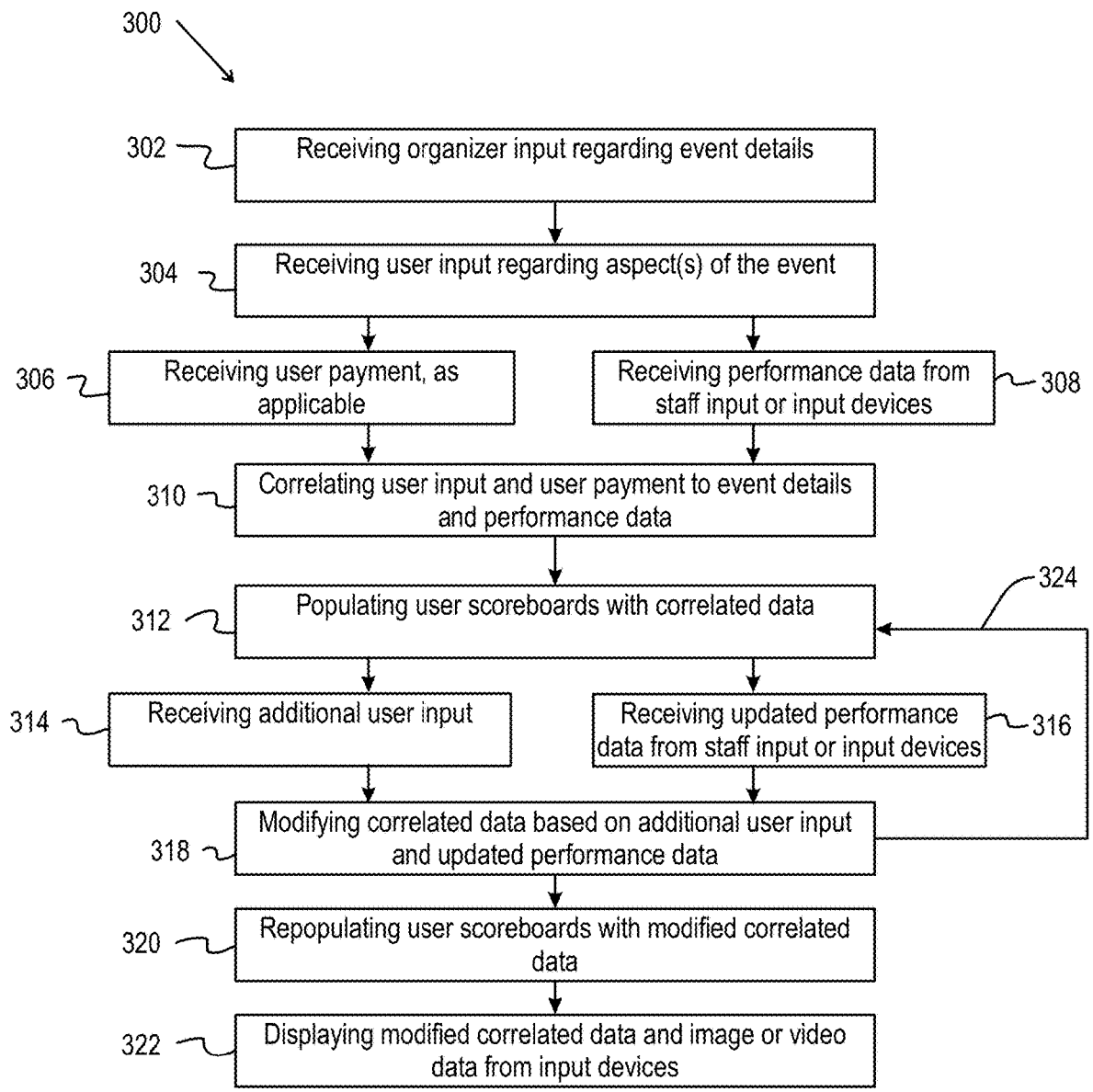
FIG. 3 illustrates a simplified flowchart of the computer system operating the application program, according to some embodiments.

Referring to FIG. 3, a system and method for managing and interacting with event information 300 may include receiving organizer input regarding event details 302 and receiving user input regarding aspects of the event or competitors within the event 304. According to some embodiments, the system may receive user payment as applicable 306. The system may receive performance data from staff input or input devices 308, such as cameras, and may correlate user input and user payment to event details and performance data 310. The system may populate a user device display, such as a user scoreboard with the correlated data 312. The system may periodically receive updated performance data from staff input or input devices 316 as well as, optionally, receiving additional user input 314. The system may modify correlated data based on additional user input and periodically updated performance data 318. The system may repopulate user device displays with modified correlated data 320 and may continuously perform 324 the steps of modifying correlated data 318 and populating user device displays 312 and displaying modified correlated data and image or video data from input devices 322. In this way, the system may provide for a real time updated feed of refined data associated with particular events, competitors, or the like and images, video, or news associated with particular events, competitors, or the like.

Figure 4:
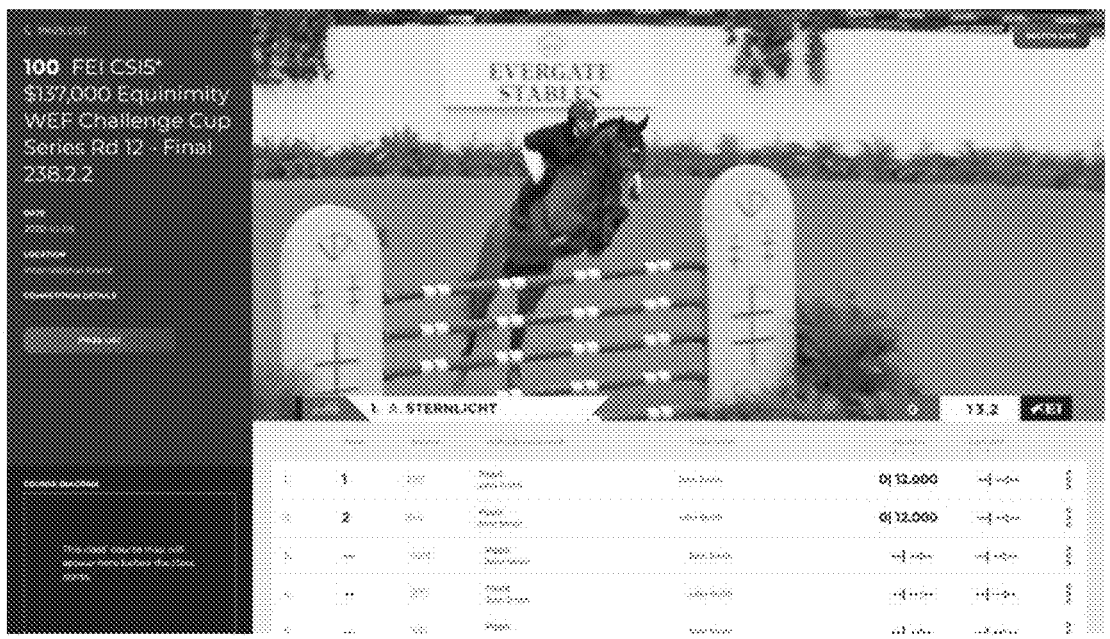
FIG. 4 illustrates a graphical user interface (GUI) of a system operating the application program, according to some embodiments.

Referring to FIG. 4, a system GUI is depicted showing a competition in progress page where the current event standings, stats, live video stream, and details of the competition can be seen.

Figure 5:
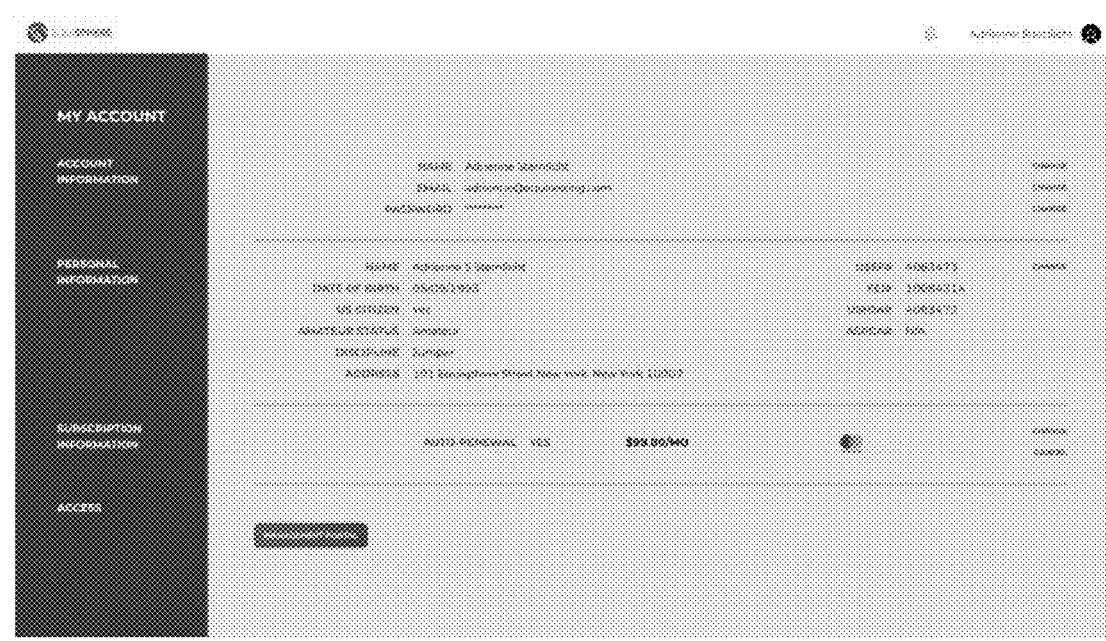
FIG. 5 illustrates a graphical user interface (GUI) of a system operating the application program, according to some embodiments.

Referring to FIG. 5, a system GUI is depicted showing a user or member account page where users may manage the details of a user account and their personal information such as governing body identification numbers, payment details, or the like.

Figures 6, 7:
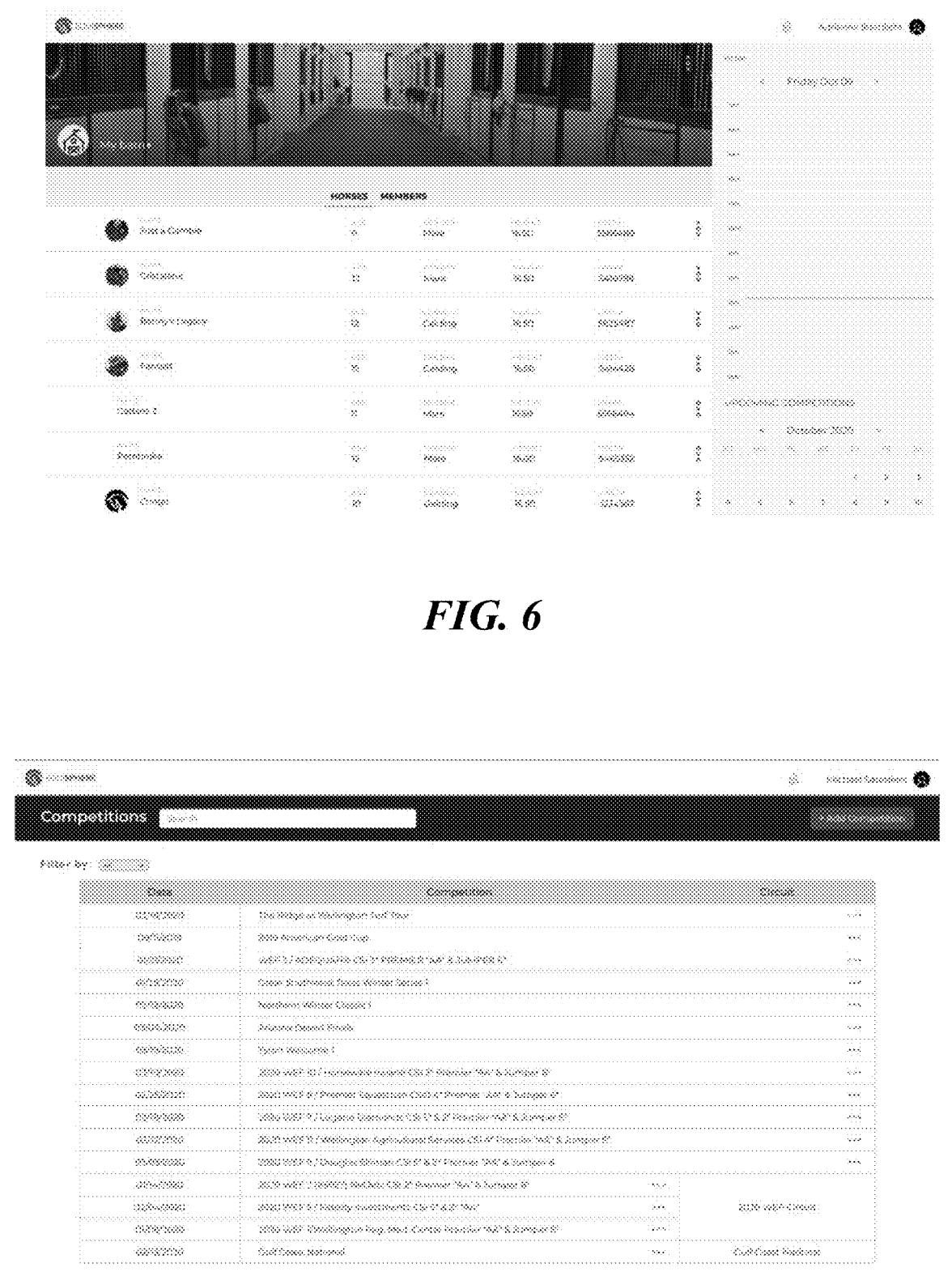

Referring to FIG. 6, a system GUI is depicted showing a roster of athletes or users which may be attached to an account allowing there to be some management control i.e. registering for competition.

Referring to FIG. 7, a system GUI is depicted showing a list of competitions that a manager user is responsible for organizing with links to access and edit the details pertinent to each.

Figures 8, 9:
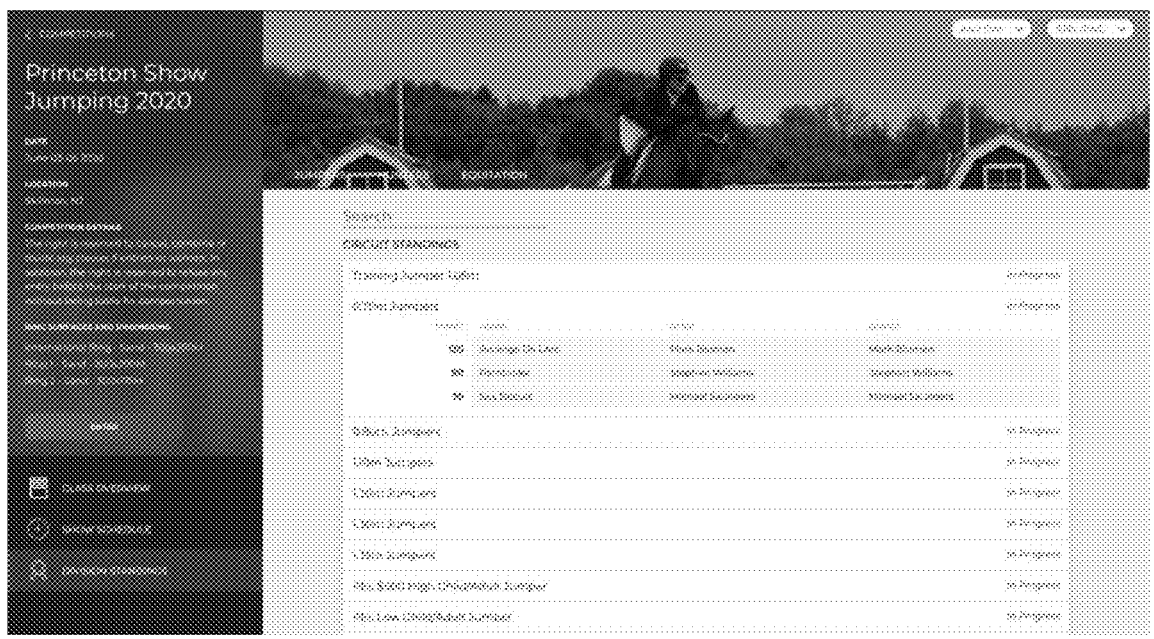
FIG. 8 illustrates a graphical user interface (GUI) of a system operating the application program, according to some embodiments.
FIG. 9 illustrates a graphical user interface (GUI) of a system operating the application program, according to some embodiments.

Referring to FIG. 8, a system GUI is depicted showing divisions or parts of a competition and the specifics for participating in each.

Referring to FIG. 9, a system GUI is depicted showing standings for each division of a competition.

Figure 10:
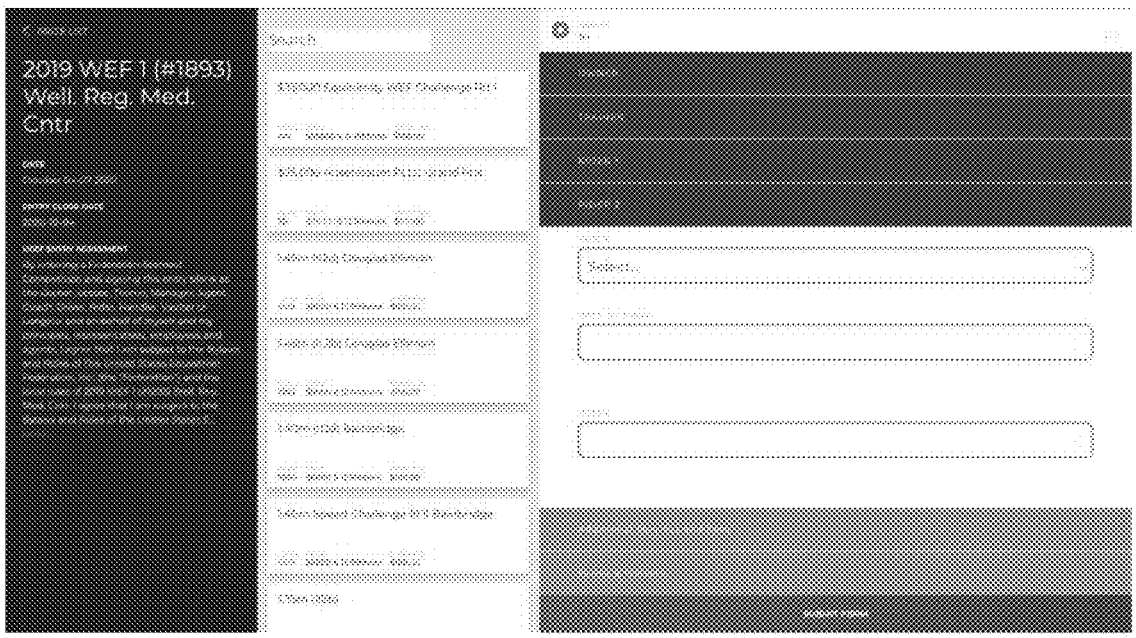
FIG. 10 illustrates a graphical user interface (GUI) of a system operating the application program, according to some embodiments.

Referring to FIG. 10, a system GUI is depicted showing a competition entry page.

Figure 11:
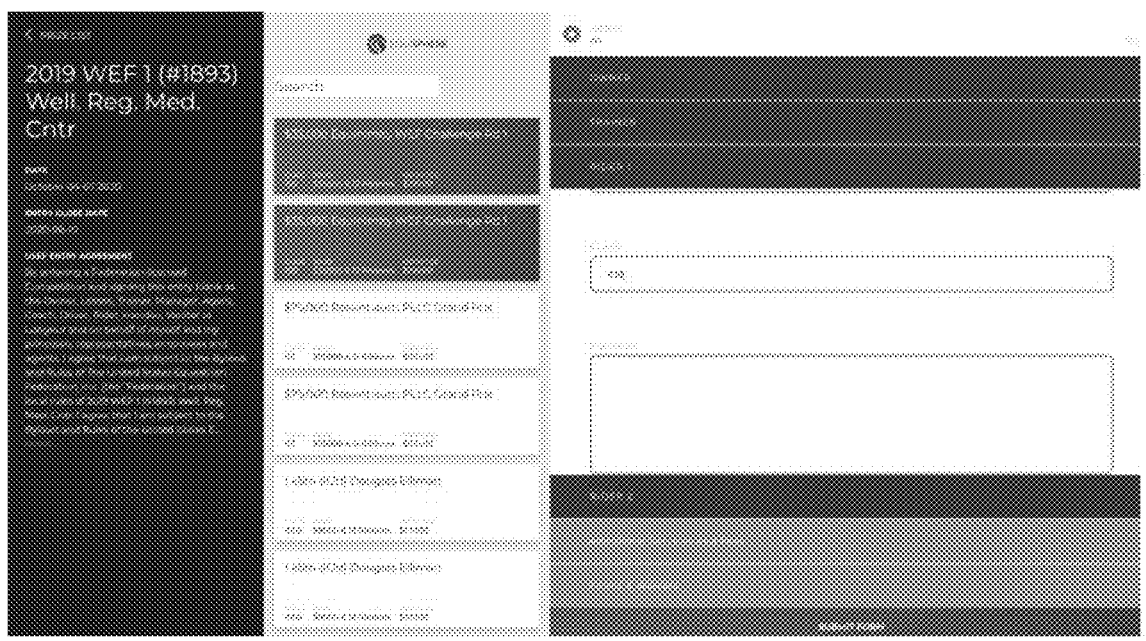
FIG. 11 illustrates a graphical user interface (GUI) of a system operating the application program, according to some embodiments.

Referring to FIG. 11, a system GUI is depicted showing a competition entry page with the divisions or sections of the competition for which an exhibitor is entering from the offerings.

Figure 12:
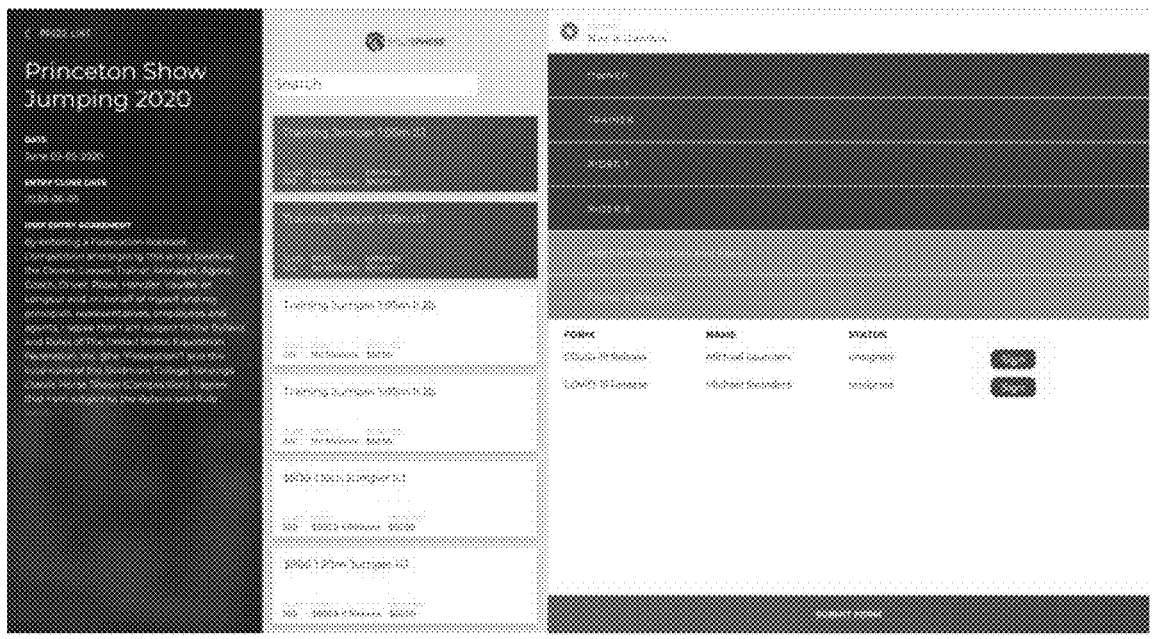
FIG. 12 illustrates a graphical user interface (GUI) of a system operating the application program, according to some embodiments.

Referring to FIG. 12, a system GUI is depicted showing a competition entry page with additional required forms or consents of the participant.

Figure 13:
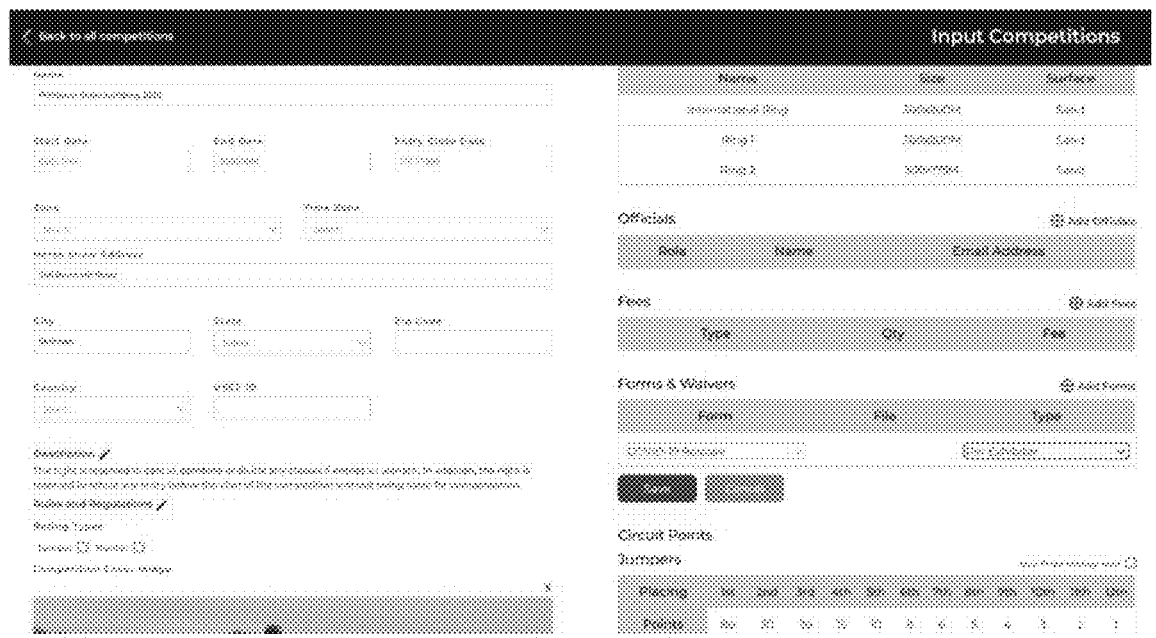
FIG. 13 illustrates a graphical user interface (GUI) of a system operating the application program, according to some embodiments.

Referring to FIG. 13, a system GUI is depicted showing a form from where competition managers input the specifications of their competition to construct an event.

Figures 14, 15:
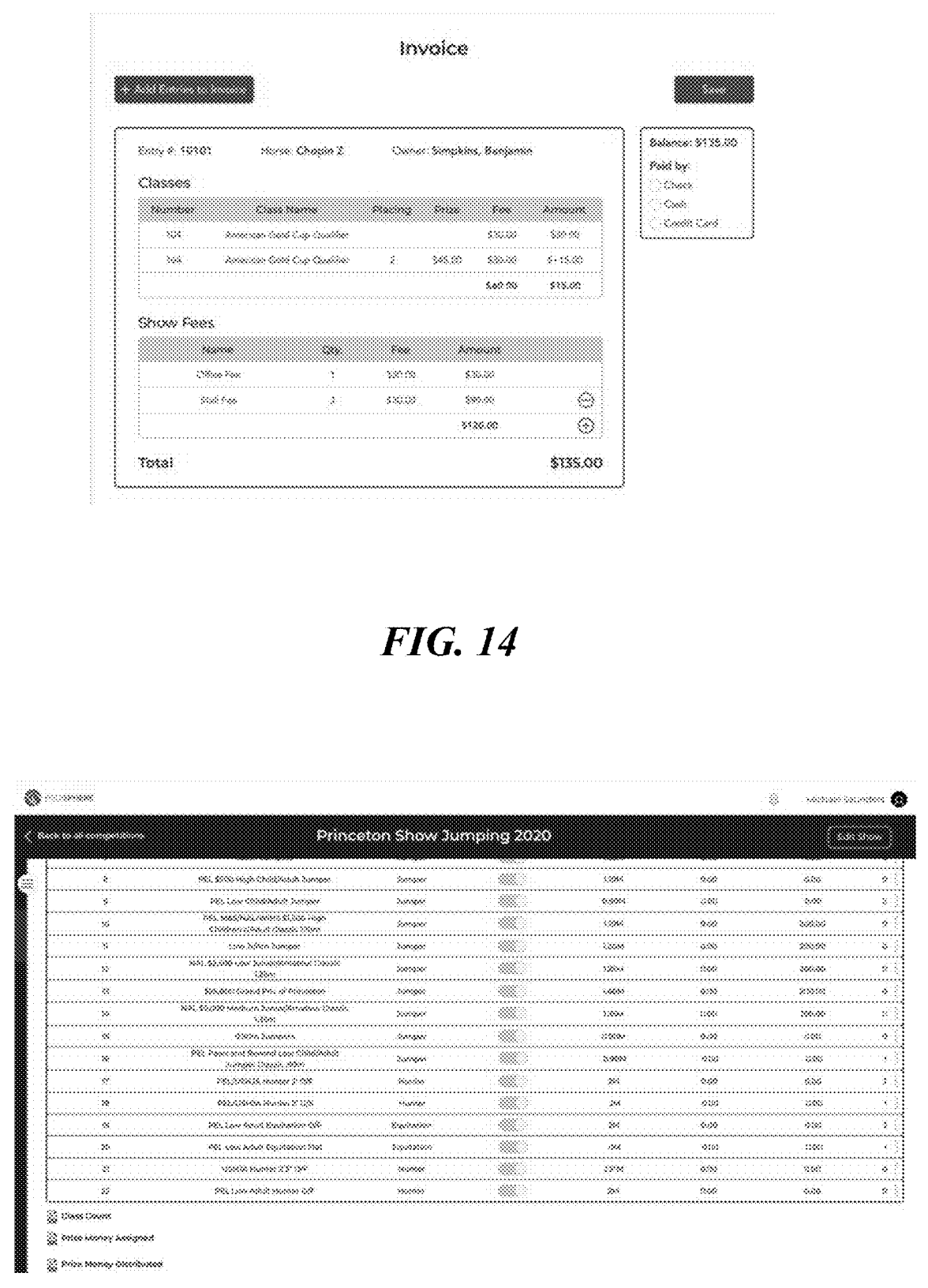

Referring to FIG. 14, a system GUI is depicted showing an invoice from a user's perspective to pay entry and other fees for participation in an event.

Referring to FIG. 15, a system GUI is depicted showing a menu where managers can view and access all of the divisions or sections of their competition to edit or alter the event's offerings.

Figure 16:
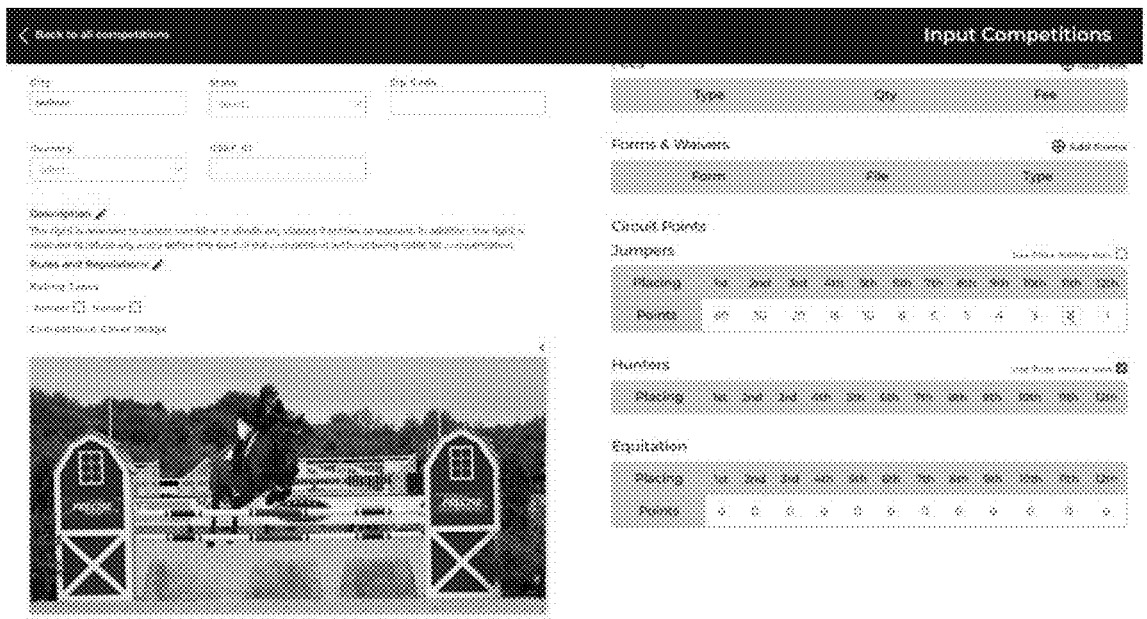
FIG. 16 illustrates a graphical user interface (GUI) of a system operating the application program, according to some embodiments.

Referring to FIG. 16, a system GUI is depicted showing a competition manager's view of the page a manager may use to edit each division of the competition.

Figure 17:
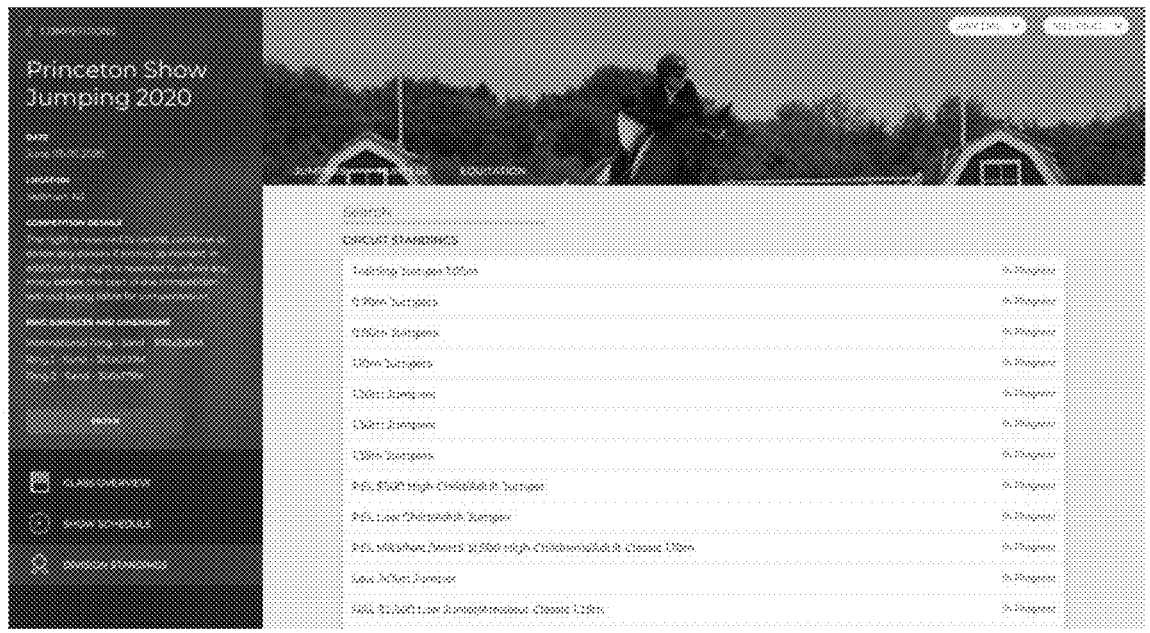
FIG. 17 illustrates a graphical user interface (GUI) of a system operating the application program, according to some embodiments.

Referring to FIG. 17, a system GUI is depicted showing a page where standings from a tournament or a series of competitions are displayed for divisions offered throughout.

Figure 18:
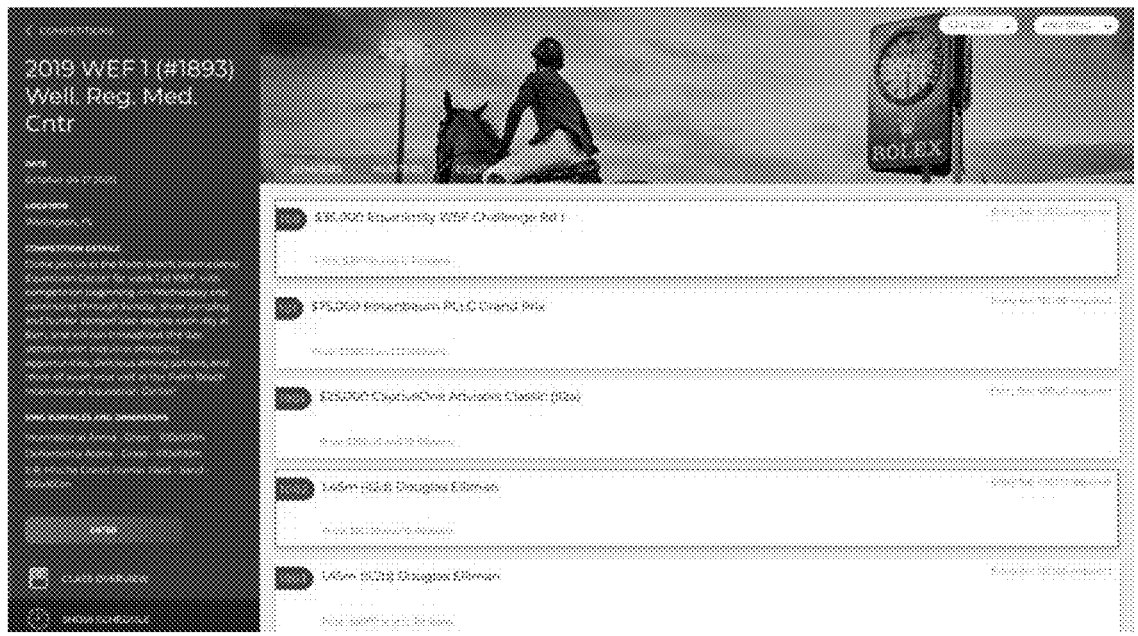
FIG. 18 illustrates a graphical user interface (GUI) of a system operating the application program, according to some embodiments.

Referring to FIG. 18, a system GUI is depicted showing a page where users can view the division offerings and their specifications of a given competition as determined by the system.

Figure 19:
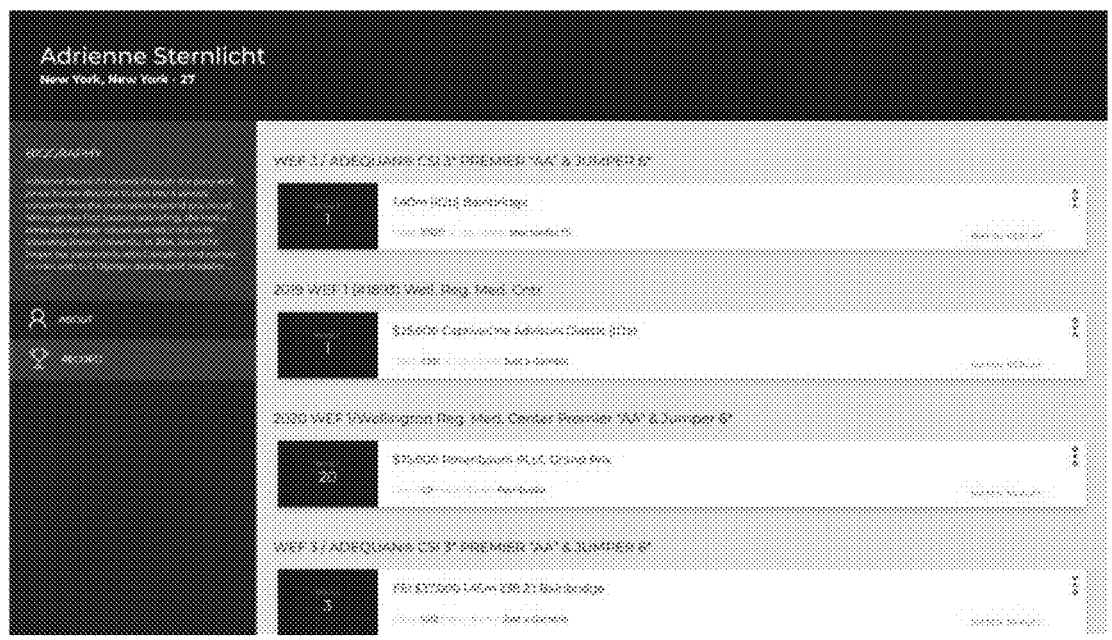
FIG. 19 illustrates a graphical user interface (GUI) of a system operating the application program, according to some embodiments.

Referring to FIG. 19, a system GUI is depicted showing a user or members page with all their results from competitions listed as determined by the system.

In this disclosure, the block diagrams in the Figures illustrate the architecture, functionality, and operation of possible implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams or flowchart illustration, and combinations of blocks in the block diagrams or flowchart illustration, can be implemented by a special purpose hardware-based system that performs the specified functions or acts or carry out combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Generally, program modules include routines, programs, components, data structures, etc. that perform particular tasks or implement particular abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other processes to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions or protocols that computer programmers can use when building software for a specific operating system. The API allows programmers to use predefined functions to interact with an operating system, instead of writing them from scratch. Common computer operating systems, including Windows, Unix, and the Mac OS, usually provide an API for programmers. An API is also used by hardware devices that run software programs. The API generally makes a programmer's job easier, and it also benefits the end user since it generally ensures that all programs using the same API will have a similar user interface.

The phrase "central processing unit" as is used herein means a computer hardware component that executes individual commands of a computer software program. It reads program instructions from a main or secondary memory, and then executes the instructions one at a time until the program ends. During execution, the program may display information to an output device such as a monitor.

The term "execute" as is used herein in connection with a computer, console, server system or the like means to run, use, operate or carry out an instruction, code, software, program or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Thus, the appended claims should be construed broadly, to include other variants and embodiments, which may be made by those skilled in the art.

What is claimed is:

1. A product comprising:
a system for interacting with event information comprising at least one computer having non-transitory memory configured to store machine instructions to be executed by the at least one computer, the machine instructions, when executed by the at least one computer, implement the following web service client functions:
receiving organizer input regarding an event;
receiving user input regarding aspects of the event or competitors within the event;
receiving staff input data;
receiving sensor data from at least one sensor;
receiving imagery data from at least one camera;
determining performance data based on at least one of staff input data, sensor data, or imagery data;
correlating user input to at least one of organizer input, staff input, sensor data, imagery data, or performance data to create at least one correlated data set excluding at least a portion of at least one of the organizer input, staff input, sensor data, imagery data, or performance data, the correlating comprising:
defining a target profile by applying weightages to at least one scoring factor above or below threshold values;
determining individual value correlation scores for individual competitors in an event; and
grouping performance data, sensor data, and imagery data for individual competitors' having individual value correlation scores meeting the target profile to create the at least one correlated data set;
populating a database with the at least one correlated data set;
populating a user device display with the correlated data set;
periodically receiving at least one of updated performance data, updated sensor data, or updated image data;
modifying the correlated data set based on at least one of updated performance data, updated sensor data, or updated image data; and
repopulating the user device display with a modified correlated data set.

2. The product as in claim 1, wherein the event is a competitive sporting event.

3. The product as in claim 1, wherein performance data comprises data pertaining to the competitive performance of at least one event participant.

4. The product as in claim 1, wherein populating a user device display with the correlated data set comprising generating a webpage displaying the correlated data set in at least one of a live-list, live-table, or live-feed.

5. A method for interacting with event information, comprising:
receiving organizer input regarding an event;
receiving user input regarding aspects of the event or competitors within the event;
receiving staff input data;
receiving imagery data from at least one camera;
determining performance data based on at least one of staff input data, sensor data, or imagery data;
correlating user input to at least one of organizer input, staff input, sensor data, image data, or performance data to create a correlated data set excluding at least a portion of at least one of the organizer input, staff input, sensor data, or image data not matching the user input, the correlating comprising:
defining a target profile by applying weightages to at least one scoring factor above or below threshold values;
determining individual value correlation scores for individual competitors in an event; and
grouping performance data, sensor data, and imagery data for individual competitors' having individual value correlation scores meeting the target profile to create the at least one correlated data set;
populating a database with the at least one correlated data set;
populating a user device display with the correlated data set;
receiving sensor data from at least one sensor;
upon receiving sensor data from at least one sensor, populating a user device display with the correlated data set;
periodically receiving at least one of updated performance data, updated sensor data, or updated image data;
modifying the correlated data set based on at least one of updated performance data, updated sensor data, or updated image data; and
repopulating the user device display with a modified correlated data set.

6. A method for interacting with event information as in claim 5, further comprising periodically performing the steps of:
correlating user input to at least one of organizer input, staff input, sensor data, or image data to create a correlated data set excluding at least some of the organizer input, staff input, sensor data, or image data;
populating a user device display with the correlated data set;
periodically receiving at least one of updated performance data, updated sensor data, or updated image data;
modifying the correlated data set based on at least one of updated performance data, updated sensor data, or updated image data; and
repopulating the user device display with a modified correlated data set.

7. A method for interacting with event information as in claim 5, further comprising receiving user payment data as part of receiving user input.

8. A method for interacting with event information as in claim 5, comprising correlating user input to at least one of organizer input, staff input, sensor data, or image data to create a correlated data set excluding at least a portion of each of the organizer input, staff input, sensor data, and image data.

9. A method for interacting with event information as in claim 5, wherein the performance data comprises individual event participant scores.

10. A method for interacting with event information as in claim 5, wherein the sensor data comprises individual event participant speed.

11. A method for interacting with event information as in claim 5, wherein the imagery data comprises live video.

12. A method for interacting with event information as in claim 5, wherein the imagery data comprises at least one real-time, still image.

13. A method for interacting with event information as in claim 5, wherein receiving sensor data comprises receiving timer data indicating that the event has started.

14. A method for interacting with event information, comprising:
- receiving user input regarding aspects of the event or competitors within the event;
- receiving live streaming video data from at least one streaming source;
- determining performance data based on live streaming video data;
- correlating user input to live streaming video data to create a correlated data set excluding at least a portion of the live streaming video data not matching the user input, the correlating comprising:
  - defining a target profile by applying weightages to at least one scoring factor above or below threshold values;
  - determining individual value correlation scores for individual competitors in an event; and
  - grouping performance data, sensor data, and imagery data for individual competitors' having individual value correlation scores meeting the target profile to create the at least one correlated data set;
- populating a database with the at least one correlated data set;
- populating a user device display with the correlated data set;
- periodically receiving updated live streaming video data;
- modifying the correlated data set based on the updated live streaming video data; and
- repopulating the user device display with a modified correlated data set.

15. A method for interacting with event information as in claim 14, wherein the live streaming video data is live streaming video of an equestrian event.

16. A method for interacting with event information as in claim 14 further comprising:
- receiving event performance data;
- populating a user device display with the event performance data comprising displaying event performance data on approximately one-third of the user device display; and
- wherein populating a user device display with the correlated data set comprises displaying live streaming video data on approximately two-thirds of the user device display.

17. A method for interacting with event information as in claim 16, wherein populating a user device display with the event performance data comprising displaying event performance data on approximately one-third of the user device display comprises populating the user device display with the live event performance data in real-time.

18. A method for interacting with event information as in claim 14, wherein user device display is remote from an event.

19. A method for interacting with event information as in claim 14, wherein the user device display is a plurality of user devices displays.

* * * * *